United States Patent

Leikauf et al.

[11] Patent Number: 6,063,184
[45] Date of Patent: *May 16, 2000

[54] ADMIXTURES FOR CEMENTITOUS COMPOSITIONS

[75] Inventors: Bernhard Leikauf, Linn; Max Oppliger, Allschwil; Salvatore Valenti, Binningen, all of Switzerland

[73] Assignee: MBT Holding AG, Zurich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/983,069

[22] PCT Filed: Apr. 8, 1997

[86] PCT No.: PCT/EP97/01730

§ 371 Date: May 22, 1998

§ 102(e) Date: May 22, 1998

[87] PCT Pub. No.: WO97/39037

PCT Pub. Date: Oct. 23, 1997

[30] Foreign Application Priority Data

Apr. 12, 1996 [GB] United Kingdom .................. 9607570

[51] Int. Cl.$^7$ .................. C08F 222/20; C08F 290/06; C04B 24/26

[52] U.S. Cl. .................. 106/802; 106/724; 106/806; 106/823; 524/4; 524/5; 524/588; 526/240; 526/279

[58] Field of Search .................. 106/724, 802, 106/806, 823; 524/4, 5, 588; 526/240, 279

[56] References Cited

U.S. PATENT DOCUMENTS

| | | | |
|---|---|---|---|
| 3,392,155 | 7/1968 | Muskat | 525/327.7 |
| 3,399,109 | 8/1968 | Zimmerman et al. | 428/414 |
| 3,563,930 | 2/1971 | Stram et al. | 524/5 |
| 4,792,360 | 12/1988 | Pierce et al. | 106/90 |
| 5,369,198 | 11/1994 | Albrecht et al. | 526/240 |
| 5,612,396 | 3/1997 | Valenti et al. | 524/5 |
| 5,665,842 | 9/1997 | Leikauf | 526/279 |
| 5,668,195 | 9/1997 | Leikauf | 524/5 |

FOREIGN PATENT DOCUMENTS

| | | | |
|---|---|---|---|
| 0 3060449 A2 | 8/1989 | European Pat. Off. | |
| 0 373 621 A2 | 6/1990 | European Pat. Off. | C08F 216/12 |
| 0 610 699 A1 | 8/1994 | European Pat. Off. | C08F 222/20 |
| 2671090 | 7/1992 | France | |
| 4445569 | 6/1995 | Germany | |
| 2285048 | 6/1995 | United Kingdom | |

OTHER PUBLICATIONS

Copy of GB Patent Office Search Report for GB Application No. 9607570.0 dated Aug. 12, 1996.

*Primary Examiner*—Anthony Green
*Attorney, Agent, or Firm*—Fish & Richardson P.C.

[57] ABSTRACT

The invention relates to a random styrene-maleic anhydride (SMA) copolymer in free acid or salt form wherein the copolymer has the following types and numbers of monomer units

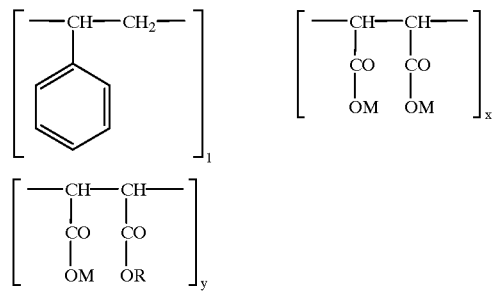

in which M is selected from hydrogen, a cation and a residue of a hydrophobic polyalkylene glycol or polysiloxane, R is the residue of methylpoly(ethylene) glycol of molecular weight (weight-average) 900–2000, x=0.35–0.75 and y=0.25–0.65. These copolymers are particularly useful as superplasticizers in cementitious compositions such as concretes and mortars.

9 Claims, No Drawings

ADMIXTURES FOR CEMENTITIOUS COMPOSITIONS

This invention relates to styrene-maleic anhydride copolymers and to their use as additives in cementitious compositions.

Styrene-maleic anhydride copolymers ("SMA") are common items of commerce and are used in a wide variety of applications. In recent years, modified SMAs in which the maleic anhydride ring has been partially esterified with poly(alkylene glycol) have been used as admixtures in cementitious compositions such as concretes and mortars. They are useful as superplasticisers, that is, admixtures which allow the cementitious composition to remain flowable at a considerably reduced water content, thus resulting in good working properties and better quality final hardened product. An especially effective SMA is described in French Published Application No. 2 671 090.

It has now been found that it is possible to prepare an SMA which provides a surprising degree of even higher performance. The invention therefore provides a random styrene-maleic anhydride copolymer in free acid or salt form, wherein the copolymer consists of the following types and numbers of monomer units:

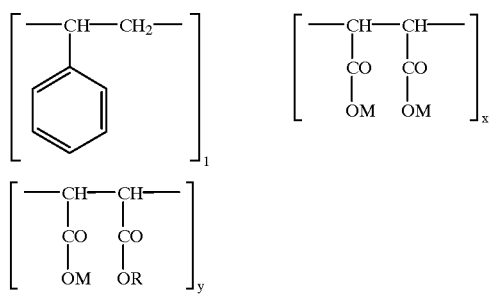

in which:
M is selected from hydrogen, a cation and a residue of a hydrophobic polyalkylene glycol or polysiloxane;
R is the residue of a methylpoly(ethylene) glycol of molecular weight (weight-average) 900–2000;
$x=0.35-0.75$ and $y=0.25-0.65$.

In a preferred embodiment, the molecular weight of R is from 900–1500 and the values of x and y are respectively 0.55–0.75 and 0.25–0.45.

It will be clear to the man skilled in the art that all numbers given above are average values. It will also be clear that in such a polymer, M may be one, all or any combination of the four possible moieties hereinabove described.

The SMAs according to this invention preferably have an average molecular weight (weight-average) from 10,000 to 50,000, more preferably from 10,000 to 25,000 and preferably have an even distribution of styrene and maleic acid half ester units, i.e. the ratio of styrene units to maleic anhydride units is about 1:1. The skilled person will understand that some deviation from this ratio is permissible, but it is preferred that the ratio remain within the range S:MA of from 1:0.8–1:1.2. Most preferred copolymers have an average molecular weight of about 13,000. When salt forms are desired (i.e., when M is a cation), they may be any suitable salt forms, and for example, alkali and alkaline earth metal salts, ammonium and hydroxyalkyl ammonium salts, amino salts, and so on.

The residue of methoxypoly(ethylene glycol) ether has the formula

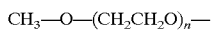

where n is a number such that the desired molecular weight of 900–2000 (weight-average) is given. Preferably the molecular weight is from 900–1500, more prefereably from 1000–1300; it has been found that, in this relatively narrow range, the best properties are given.

When M is not hydrogen or a cation, it is the residue of a copolymer consisting of units derived from ethylene oxide and propylene oxide, the residue of a polypropylene glycol having from 10 to 200 units derived from propylene oxide or the residue of a polysiloxane consisting of di-$C_{1-4}$alkylsiloxane units. The ethyleneoxide/propylene oxide copolymers may be represented by formula I $$R_2-O-(CH_2CH_2O)_{\overline{p}}-(\underset{\underset{CH_3}{|}}{CH}-CH_2O)_{\overline{q}}-(CH_2CH_2O)_{\overline{r}}-H \quad (I)$$

in which $R_2$ is hydrogen or $C_{1-6}$ alkyl, and p, q and r are numbers from 0 to 100 with the provisos that at least one of p, q, and r is at least 1, and that q>p+r. Preferred polysiloxanes correspond to formula II

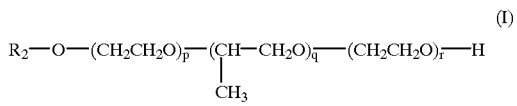

in which q has the same significance as previously mentioned.

Typical examples of suitable, commercially-available hydrophobic polyalkylene glycols include:

| | |
|---|---|
| "Pluronic" PE 6100 | (BASF) |
| "Pluronic" PE 3100 | (BASF) |
| SYNPERONIC PE L-61 | (ICI) |
| DOWFAX 20 A 64 | (DOW) |
| DOWFAX 20 A 612 | (DOW) |
| SYNALOX 50-50 B | (DOW) |
| SYNALOX 100-150 D | (DOW) |
| SYNALOX 100-D95 | (DOW) |
| CC-118 | (Nippon Oil & Fats) |
| CD-115 | (MBT) |

Typical examples of suitable, commercially-available polysiloxanes include:

| | |
|---|---|
| VP 1610 | (Wacker) |
| SLM 50400/61 | (Wacker) |
| SLM 50400/62 | (Wacker) |
| SLM 50480/6 | (Wacker) |

It is not practically possible to esterify fully all of the maleic anhydride units, nor is this desirable. For the purposes of this invention, it is preferred to retain some carboxyl groups. It is preferred that from 5% to 40%, preferably from 10% to 30%, of the theoretically available carboxyl groups should be esterified with R.

SMAs according to the invention may be produced by methods well known in the art, for example, by reacting a random copolymer of the following composition

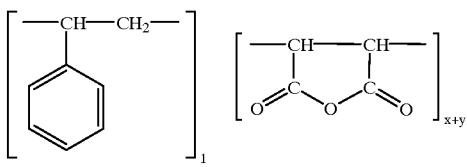

with a compound of formula III $$CH_3—(CH_2CH_2O)_n—H \quad (III)$$

as well as with compounds of formula I or II in the appropriate amounts and optionally reacting the resulting copolymer with an alkaline earth base, with ferrous or aluminum salts or with ammonia, an alkanolamino or an alkylamino compound. After the reaction of the maleic acid anhydride groups in the styrene-maleic anhydride copolymer shown hereinabove with compounds of formula I or II and III, there will remain in the final polymer a number of anhydride groups which will form dicarboxylic acid groups in aqueous solution. The number of such units will depend on the amounts used.

Copolymers of the type described hereinabove are obtained by copolymerization of styrene and maleic acid anhydride and are well known and are described for example in C. E. Schildknecht, "Vinyl and Related Polymers" John Wiley and Sons, Inc., New York, 1952.

Polyalkylene glycols of formula I are also well-known compounds and may be obtained by addition of alkylene oxides, especially ethylene oxide and propylene oxide to alkyl- or cycloalkylalcohols or phenols, or by polyaddition of the alkylene oxides.

The polysiloxanes of formula II are also well-known compounds and may be obtained, for example, by the polycondensation of dichlorodimethylsilane with chlorotrimethylsilane and water.

The SMAs according to this invention may be used in a variety of applications, but they are especially suitable as superplasticisers in cementitious compositions. Examples of such cementitious mixes are mortars and concretes. As hydraulic binder there may be used Portland cement, alumina cement or blended cement, for example, pozzolanic cement, slag cement or other types, Portland cement being preferred.

The SMAs according to this invention are added in amounts of from 0.01 to 10%, preferably from 0.1 to 3% by weight based on the weight of the cement. In such amounts, the organic copolymers of the invention have the property of fluidifying the cementitious mixes to which they have been added and are therefore excellent superplasticizers. They have the additional advantage of having a degree of air entraining properties which is lower than those of similar copolymers.

The invention therefore also provides a flowable cementitious composition which comprises cement, water and an effective amount of an SMA polymer as hereinabove defined.

In this case, "an effective amount" means that quantity of SMA polymer which needs to be added to provide the desired extent of flow. While it is true that the quantities needed will nearly always fall within the 0.01–10% mentioned hereinabove, it is possible that proportions lying outside this range may also be utilised. This will depend on the composition and conditions used, but it is well within the skill of the art to determine a suitable quantity in every case.

The invention also provides a method for enhancing the flow of a cementitious composition, comprising the addition to the cementitious composition of an effective amount of an SMA polymer as hereinabove defined.

It is possible and often convenient to blend the SMA copolymers of this invention with other known admixtures so that they may be added to a cementitious composition as a single package, thus achieving economies in handling. Such admixtures include, but are not limited to, set accelerators and retarders, frost protection agents and air-entraining agents. It is still possible, of course, to add such admixtures separately to a cementitious composition in the conventional manner.

The following examples, in which all parts, ratios and percentages are by weight and all temperatures are expressed in degrees Centigrade, illustrate the invention.

PREPARATION EXAMPLE 93.6 parts of maleic anhydride, are melted at 65° in a flask under an atmosphere of nitrogen and mixed with 214.9 parts of molten polyethylene glycol monomethyl ether of molecular weight 1150. While stirring, 0.053 parts hydroquinone monomethylether and 2.43 parts dodecyl mercaptan are added and finally 4.18 parts azodiisobutyronitrile (AIBN) is added to give a clear yellowish solution (solution A). Care should be taken to maintain the solution between 25° and 50°.

In another flask equipped with stirrer, thermometer, cooling and two funnels (dosage pumps) 215.26 parts polyethylene glycol monomethyl ether of the type hereinabove described and 4.46 parts maleic anhydride are melted at 65° and stirred. The flask is purged with nitrogen for 5 minutes and kept under nitrogen. The clear colourless fluid is heated to 100°(±5°), and when the temperature is reached, there are added simultaneously the solution A and 95.63 parts styrene, the additions being made uniformly over one hour. 0.36 parts AIBN is then added and the solution is stirred at 100° for a further hour to this mixture is then added 11.17 parts of demineralised water followed by 16.52 parts "Pluronic" PE 6100 (a hydrophobic polyoxyethylene-polyoxypropylene oxide having a polypropylene oxide block of 1750 g/mol and a percentage of polyethylene oxide of 10%) added uniformly over a period of 5 minutes. The solution is heated to 140° and stirred for 1 hour. After cooling to 70°, the solution is diluted with 981.04 parts demineralised water. After cooling to room temperature, the emulsion is neutralized with sodium hydroxide solution (32%) to bring the pH to about 7.0.

APPLICATION EXAMPLES (a) Concrete

Concrete compositions are prepared by mixing cement (CEM I 52.5, 380 kg/m³) and aggregate (0–16 mm) at a water/cement ratio of 0.45. Samples of each are dosed with the material as prepared above and with a high-performance commercially-available SMA-based superplasticiser (RHEOBUILD (trade mark) 3040 ex MBT is used—this material contains 40% by weight active material). The quantities and results are shown in Table 1.

TABLE 1

| dosage (%) | material | air (%) | flow (cm) $t_0$ | $t_{60}$ | $t_{90}$ | compr. strength (MPa) (24 h) |
|---|---|---|---|---|---|---|
| 0.5 | invention | 2.8 | 44 | 31 | — | 30.6 |
| 0.5 | Rh 3040 | 3.4 | <35 | <29 | 24 | 35 |
| 0.8 | invention | 2.4 | 61 | 49 | 46 | 33 |

TABLE 1-continued

| dosage (%) | material | air (%) | flow (cm) $t_0$ | $t_{60}$ | $t_{90}$ | compr. strength (MPa) (24 h) |
|---|---|---|---|---|---|---|
| 1.0 | invention | 2 | 70 | 70 | 68 | 13.6 |
| 1.0 | Rh 3040 | 3.4 | 63 | 54 | 51 | 7.9 |

The composition according to the invention is used as a 40% weight solution. Dosage is based on active material by weight.

$t_0$, $t_{60}$ and $t_{90}$ are the times zero, after 60 minutes and after 90 minutes respectively. The blank entry at $t_{90}$ means that no flow could be measured.

It can be seen that the composition according to the invention results in a superior concrete. At lower dosages, there is only a slight loss in compressive strength, in return for a better air entrainment (i.e., less air) and better flow. At higher dosages, the compressive strength is also higher.

(b) Mortar

A mortar composition is made up from water and CEM I 52.5 cement at a W/C ratio of 0.40. Samples of mortar are dosed with the composition according to the invention and the abovementioned "Rheobuild" 3040. The results obtained in testing are shown in Table 2.

TABLE 2

| dosage (%) | material | air (%) | flow (cm) $t_0$ | $t_{60}$ | $t_{90}$ |
|---|---|---|---|---|---|
| 0.4 | invention | 1.7 | 22 | 19 | 15 |
| 0.7 | Rh 3040 | 2.0 | 22 | 18 | — |

Again, the blank entry means that flow had stopped.

In the mortar case, the composition according to the invention again shows superior properties.

COMPARATIVE EXAMPLE

Comparison of a copolymer of the present invention with a known high-performance copolymer.

The copolymers involved are the copolymer whose preparation is hereinabove described (hereinafter "Material A") and the copolymer of Example 1 of French Patent 2 671 090 (hereinafter "Material B").

A concrete composition is prepared by mixing cement (CEM I 42.5, 320 kg/m³) and aggregate (0–32 mm) at a water/cement ratio of 0.5. Samples of this composition are dosed with the two copolymers (dosages are given below as solids by weight on cement the materials are used at 40% solids by weight aqueous solutions). The following measurements are made:

| | |
|---|---|
| air content (%) | by German Test Method DIN 1048, Part 1 |
| flow (cm) | by German Test Method DIN 1048, Part 1 |
| (tested at 0, 60 and 90 minutes from mixing) | by German Test Method DIN 1048, Part 5 |
| compressive strength at 24 H (Mpa) | |

The results are shown in the following table:

| dosage | material | air content | flow $t_0$ | $t_{60}$ | $t_{90}$ | compressive strength |
|---|---|---|---|---|---|---|
| 0.7 | A | 1.8 | 50 | 41 | 39 | 18 |
| 0.7 | B | 3.1 | 38 | 36 | 35 | 17 |
| 1.0 | A | 2.1 | 53 | 47 | 45 | 15 |
| 1.0 | B | 2.7 | 45 | 42 | 40 | 15 |

It can be seen from the table that the performance of the material according to the invention is superior. For the same (and sometimes better) compressive strength, the composition according to the invention gives less air entraining and exhibits appreciably better flow.

We claim:

1. A random styrene-maleic anhydride (SMA) copolymer in free acid or salt form wherein the copolymer comprises the monomer units:

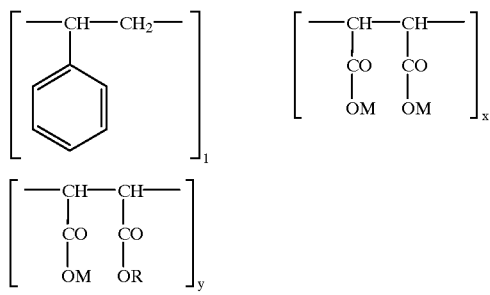

in which:

M is selected from hydrogen, a cation and a residue of a hydrophobic polyalkylene glycol or polysiloxane;

R is the residue of methylpoly(ethylene)glycol of molecular weight (weight-average) 900–2000;

x=0.35–0.75 and y=0.25–0.65.

2. A random SMA copolymer according to claim 1, wherein the molecular weight of R is from 900–1500, x is from 0.55–0.75 and y is from 0.25–0.45.

3. A random SMA copolymer according to claim 1, wherein the molecular weight of R is from 1000–1300.

4. A random SMA copolymer according to claim 1, wherein, M is derived from an entity selected from the group consisting of:

(i) ethyleneoxide/propylene oxide copolymers of the formula I

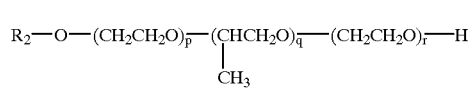
(I)

in which $R_2$ is hydrogen or $C_{1-6}$ alkyl, and p,q and r are numbers from 0 to 100 with the provisos that at least one of p,q and r are at least 1, and that q>p+r; and (ii) the polysiloxanes of the formula II

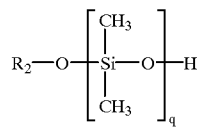
(II)

in which q has the same significance as under (i).

5. A flowable cementitious composition which comprises cement, water, and an effective amount of a random styrene-maleic anhydride copolymer according to claim 1.

6. A method for enhancing the flow of a cementitious composition, comprising the addition to the cementitious composition of an effective amount of a random styrene-maleic anhydride copolymer according to claim 1.

7. A random SMA copolymer according to claim 2, wherein the molecular weight of R is from 1000–1300.

8. A flowable cementitious which comprises cement, water and an effective amount of a random styrene-maleic anhydride copolymer according to claim 4.

9. A method for enhancing the flow of a cementitious composition, comprising the addition to the cementitious composition of an effective amount of a random styrene-maleic anhydride copolymer according to claim 4.

* * * * *